United States Patent [19]

Itoh et al.

[11] Patent Number: 4,737,556

[45] Date of Patent: Apr. 12, 1988

[54] NON-HYDROUS SOFT CONTACT LENS AND PROCESS FOR PRODUCING THE SAME

[75] Inventors: Tetsuo Itoh, Machida; Noboru Satoh; Kazuhiko Takahashi, both of Yokohama; Taro Suminoe, Tokyo; Takao Shimizu, Toda, all of Japan

[73] Assignees: Japan Synthetic Rubber Co., Ltd.; Ricky Contact Lens Research Institute Inc., both of Tokyo, Japan

[21] Appl. No.: 935,954

[22] Filed: Nov. 28, 1986

[30] Foreign Application Priority Data

Nov. 29, 1985 [JP] Japan ................................ 60-267297

[51] Int. Cl.$^4$ .............................................. C08F 18/20
[52] U.S. Cl. ................................................... 526/245
[58] Field of Search ........................................ 526/245

[56] References Cited

U.S. PATENT DOCUMENTS

| 3,808,179 | 4/1974 | Gaylord | 526/230.5 |
| 3,850,892 | 11/1974 | Shen et al. | 526/320 |
| 3,950,315 | 4/1976 | Cleaver | 526/245 |
| 4,540,761 | 9/1985 | Kawamura et al. | 526/245 |

FOREIGN PATENT DOCUMENTS

| 56-118408 | 9/1981 | Japan | 526/245 |
| 57-51705 | 3/1982 | Japan | 526/245 |
| 86/04341 | 7/1986 | World Int. Prop. O. | 526/245 |

Primary Examiner—Joseph L. Schofer
Assistant Examiner—N. Sarafim

Attorney, Agent, or Firm—Oblon, Fisher, Spivak, McClelland & Maier

[57] ABSTRACT

A non-hydrous soft contact lens comprising a copolymer comprising, as monomer units, 49.9 to 95 mole % of an acrylate represented by Formula (I) shown below, 0 to 10 mole % of acrylic acid or the specified ester thereof, 4.9 to 50 mole % of a methacrylate represented by Formula (II) shown below, and 0.1 to 10 mole % of a crosslinking monomer.

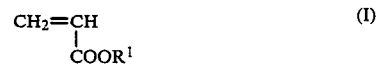

wherein $R^1$ is at least one selected from the group consisting of a particular straight chain fluoroalkyl group and a particular straight chain alkyl group.

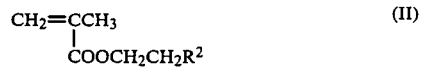

wherein $R^2$ is a particular straight chain fluoroalkyl group.

The present soft contact lens requires no sterilization by boiling, and has good resistance to stain, good oxygen permeability, good elastic recovery and good shape stability.

A process for producing the above non-hydrous soft contact lens, comprising the step of subjecting a rigid precursor lens to treatment(s) of esterification and/or transesterification, is also disclosed.

10 Claims, No Drawings

NON-HYDROUS SOFT CONTACT LENS AND PROCESS FOR PRODUCING THE SAME

This invention relates to a soft contact lens and a process for producing the same, and, more particularly, to a non-hydrous soft contact lens having high oxygen permeability and a process for producing the same.

As soft contact lenses, there are known hydrous soft contact lenses made of hydrogel type polymers such as poly-2-hydroxyethyl methacrylate, and non-hydrous soft contact lenses made of silicone polymers or the like. The hydrous soft contact lenses, however, have insufficient oxygen permeability to be apt to damage the metabolism of corneal tissue, or require frequent sterilization by boiling to prevent the propagation of bacteria and the like, thereby being cumbersome. On the other hand, the non-hydrous soft contact lenses made of silicone polymers or the like have good oxygen permeability, but are accompanied with problems such that they tend to be contaminated by lachrymal components to cause a blur of contact lens after continuous wearing for a long period of time, which blur can not be removed by cleaners.

Also, it is desirable for soft contact lenses to have good affinity for eyes without any feeling of foreign matters. U.S. Pat. No. 3,850,892 discloses a process for producing a non-hydrous soft contact lens having good affinity for an eye, by subjecting a precursor mainly comprising a polyacrylate and/or a polymethacrylate and having the shape of a contact lens to esterification treatment or transesterification treatment. This contact lens, however, has insufficient oxygen permeability and can not be worn for a long time.

Now, it has been sought after to provide a soft contact lens that may require no sterilization by boiling and causes no metabolism disorder in the corneal tissue even after wearing for a long time, in other words, a soft contact lens of non-hydrous type, having resistance to the stain by lachrymal components and having good oxygen permeability. As such a contact lens, U.S. Pat. No. 3,808,179 proposes a contact lens comprising a copolymer of a fluoroalkyl ester of acrylic acid or methacrylic acid with an alkyl ester of acrylic acid or methacrylic acid. U.S. Pat. No. 3,950,315 also proposes a soft contact lens comprising a copolymer of methyl methacrylate with a fluoroalkyl ester of methacrylic acid.

The soft contact lens disclosed in the above U.S. Pat. No. 3,808,179, however, involves the following problems:

(1) The soft contact lens obtained results in insufficient oxygen permeability when the number of carbon atoms of a fluoroalkyl group of the starting acrylic acid fluoroalkyl ester or methacrylic acid fluoroalkyl ester is small.

(2) When on the other hand the number of carbon atoms of a fluoroalkyl group of the starting acrylic acid fluoroalkyl ester or methacrylic acid fluoroalkyl ester is large, an internal stress is induced in the resultant polymer during the polymerization, whereupon the soft contact lens obtained tends to be deformed or shows delayed elastic recovery. Namely, it takes a considerably long time for recovery when the soft contact lens is held and bent with fingers or the like.

(3) When a methacrylic acid alkyl ester is used as the starting material, the glass transition temperature of soft contact lens rises, resulting in decrease in the oxygen permeability.

The soft contact lens disclosed in the above U.S. Pat. No. 3,950,315, although it aims at improving the oxygen permeability, has also a problem that the copolymer constituting the contact lens has a high glass transition temperature as it uses methyl methacrylate as a monomer, whereby sufficient oxygen permeability can not be attained.

Accordingly, an object of this invention is to solve the problems mentioned above, and to provide a non-hydrous soft contact lens requiring no sterilization by boiling, having resistance to stain by lachrymal components, having very good oxygen permeability, having good elastic recovery, and being free from the deformation due to internal stress induced during the polymerization.

This invention provides a non-hydrous soft contact lens comprising a copolymer comprising, as monomer units, 49.9 to 95 mole % of an acrylate represented by Formula (I) shown below, 0 to 10 mole % of at least one selected from the group consisting of acrylic acid, an acrylic acid alkyl ester or acrylic acid fluoroalkyl ester whose alkyl group or fluoroalkyl group has 1 to 3 carbon atoms, 4.9 to 50 mole % of a methacrylate represented by Formula (II) shown below, and 0.1 to 10 mole % of a crosslinking monomer.

(I)

wherein $R^1$ is at least one selected from the group consisting of a straight chain fluoroalkyl group represented by the formula: $-(CH_2)_l-C_mF_nH_p$, where l is an integer of 1 or 2, m is an integer of 3 to 8, n is an integer of 6 or more, p is an integer of 0 or more, and m, n and p satisfy the equation: $n+p=2m+1$; and a straight chain alkyl group represented by the formula: $-C_qH_{2q+1}$, where q is an integer of 4 to 10.

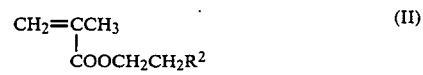

(II)

wherein $R^2$ is a straight chain fluoroalkyl group represented by the formula: $-C_xF_yH_z$, where x is an integer of 6 to 8, y is an integer of 12 or more, z is an integer of 0 or more, and x, y and z satisfy the equation: $y+z=2x+1$.

As compared with conventional hydrous soft contact lenses or non-hydrous soft contact lenses, the soft contact lens of this invention is more advantageous in that it may develop no change such as a blur due to absorption of stain on the soft contact lens even after wearing for a long time; it may not bring about any metabolism disorder of corneal tissue even after wearing for a long time, as it shows so high oxygen permeability that can not be expected from conventional hard contact lenses made of a copolymer comprising an acrylic acid fluoroalkyl ester or methacrylic acid fluoroalkyl ester; it can give good feeling of fitness when worn; it requires no sterilization by boiling as it is of non-hydrous type; and it may not cause any deformation due to internal stress to be induced in a copolymer during the copolymerization.

In Formula (I) representing the acrylates which are monomers constituting the copolymer used in this invention, $R^1$ is required to be a straight chain fluoroalkyl group or alkyl group having 4 to 10 carbon atoms. If the number of carbon atoms in the fluoroalkyl group or alkyl group represented by $R^1$ is 3 or less, the hardness of the soft contact lens obtained becomes too high, and there can be obtained nothing that has the high oxygen permeability featured in this invention. Meanwhile, the soft contact lens according to this invention can be produced, as will be described herein, by (1) a process comprising carrying out polymerization directly in a mold and (2) a process comprising cutting and polishing a rigid polymer into the shape of a contact lens, followed by softening by esterification treatment and/or transesterification treatment. Now, if the number of carbon atoms in the fluoroalkyl group or alkyl group represented by $R^1$ is 11 or more, a large internal stress may be induced in the copolymer during the course of the polymerization, resulting in deformation of the soft contact lens by release of internal stress after it has been released from a mold after polymerization in the case of the process (1) or after it has been softened by esterification treatment and/or transesterification treatment in the case of the process (2).

The acrylates represented by Formula (I) may include, for example, acrylic acid fluoroalkyl esters such as 2,2,3,4,4,4-hexafluorobutyl acrylate, 2,2,3,3,4,4,4-heptafluorobutyl acrylate, 2,2,3,3,4,4,5,5-octafluoropentyl acrylate, 2,2,3,3,4,4,5,5,5-nonafluoropentyl acrylate, 2,2,3,3,4,4,5,5,6,6,7,7-dodecafluoroheptyl acrylate, 2,2,3,3,4,4,5,5,6,6,7,7,7-tridecafluoroheptyl acrylate, 3,3,4,4,5,5,6,6,7,7,8,8-dodecafluorooctyl acrylate, 3,3,4,4,5,5,6,6,7,7,8,8,8-tridecafluorooctyl acrylate, 3,3,4,4,5,5,6,6,7,7,8,8,9,9,10,10-hexadecafluorodecyl acrylate, and 3,3,4,4,5,5,6,6,7,7,8,8,9,9,10,10,10-heptadecafluorodecyl acrylate; and acrylic acid alkyl esters such as n-butyl acrylate, n-pentyl acrylate, n-hexyl acrylate, n-heptyl acrylate, 2-ethylhexyl acrylate, n-octyl acrylate, n-nonyl acrylate, and n-decyl acrylate; which may be used in combination of two or more.

Of the above acrylic acid fluoroalkyl esters and acrylic acid alkyl esters, preferable ones include 2,2,3,3,4,4,4-heptafluorobutyl acrylate, 2,2,3,4,4,4-hexafluorobutyl acrylate, 3,3,4,4,5,5,6,6,7,7,8,8,8-tridecafluorooctyl acrylate, 3,3,4,4,5,5,6,6,7,7,8,8,9,9,10,10,10-heptadecafluorodecyl acrylate, n-hexyl acrylate, n-octyl acrylate, etc.

In Formula (II) representing the methacrylate which is another monomer constituting the copolymer used in this invention, $R^2$ must be a straight chain fluoroalkyl group having 6 to 8 carbon atoms. If the number of carbon atoms in the fluoroalkyl group represented by $R^2$ is 5 or less, the oxygen permeability of the resulting soft contact lens is lowered, and, if it is 9 or more, the internal stress tends to be induced in the copolymer during the course of the polymerization.

As will be seen from Formula (II), it is essential that an ethylene group ($-CH_2CH_2-$) is present between the $-R^2$ group and the $-COO$ group in the methacrylate. As the compounds resembling to the compounds of Formula (II), methacrylates in which a methylene group ($-CH_2-$) is present singularly between the $-R^2$ group and the $-COO$ group are known from the above-mentioned U.S. Pat. No. 3,808,179. However, if these compounds are used as monomers constituting the copolymer, it follows that a soft contact lens obtained not only shows a large delayed elastic recovery, but also brings about the deformation of the contact lens due to the release of internal stress induced in the copolymer during the copolymerization, whereby the product is unsuitable as a soft contact lens.

The number of fluorine atoms in the fluoroalkyl group of $R^2$ in the methacrylate represented by Formula (II) must be 12 or more. If the number of fluorine atoms in $R^2$ is less than 12, the oxygen permeability of the soft contact lens obtained becomes insufficient.

The methacrylates represented by Formula (II) may include, for example, 3,3,4,4,5,5,6,6,7,7,8,8-dodecafluorooctyl methacrylate, 3,3,4,4,5,5,6,6,7,7,8,8,8-tridecafluorooctyl methacrylate, 3,3,4,4,5,5,6,6,7,7,8,8,9,9,10,10-hexadecafluorodecyl methacrylate, and 3,3,4,4,5,5,6,6,7,7,8,8,9,9,10,10,10-heptadecafluorodecyl methacrylate, etc., which may be used in combination of two or more.

Of the above methacrylates, preferable ones include 3,3,4,4,5,5,6,6,7,7,8,8,8-tridecafluorooctyl methacrylate and 3,3,4,4,5,5,6,6,7,7,8,8,9,9,10,10,10-heptadecafluorodecyl methacrylate.

The crosslinking monomer which is still another monomer constituting the copolymer used in this invention may include, for example, divinyl esters of organic dicarboxylic acids such as oxalic acid, terephthalic acid, hexahydroterephthalic acid, malonic acid and succinic acid; divinyl hydrocarbons (i.e., $\alpha,\omega$-diolefinic hydrocarbons) such as divinyl benzenes, divinyl toluenes, 1,4-pentadiene and 1,5-hexadiene; diacrylic acid esters or dimethacrylic acid esters of ethylene glycol, diethylene glycol, 1,3-propanediol, 1,2-propanediol, 1,3-butanediol, 1,4-butanediol, 1,6-hexanediol, and the like; 2-(2-hydroxy-1,1-dimethylethyl)-5-hydroxymethyl-5-ethyl-1,3-dioxane diacrylate or dimethacrylate, tricyclodecanedimethylol diacrylate or dimethacrylate; $\epsilon$-caprolactone addition products of tricyclodecanedimethylol diacrylate or dimethacrylate; reaction products of acrylic acid or methacrylic acid, trimethylol propane and phthalic anhydride; reaction products of acrylic acid or methacrylic acid, propylene oxide and phthalic anhydride; reaction products of acrylic acid or methacrylic acid, 1,4-butanediol or 1,6-hexanediol and phthalic acid; reaction products of acrylic acid or methacrylic acid with propylene glycol, ethylene glycol, diethylene glycol or triethylene glycol and phthalic anhydride; and crosslinking monomers having cyclic structure such as 2,2-bis(4-acryloxypolyethoxyphenyl)propane, 2,2-bis(4-methacryloxypolyethoxyphenyl)propane, diglycidyl terephthalate and spiroglycol diglycidyl ether, etc., which may be used in combination of two or more.

Of the above crosslinking monomers, preferable ones include dimethacrylic acid esters of ethylene glycol, diethylene glycol, 1,3-butanediol, 1,4-butanediol and 1,6-hexanediol.

The proportion of the above monomers in the copolymer constituting the soft contact lens of this invention is determined to be 49.9 to 95 mole %, preferably 60 to 80 mole %, of the acrylate represented by Formula (I); 0 to 10 mole %, preferably 0 to 5 mole %, of the compound selected from the group consisting of acrylic acid, an acrylic acid alkyl ester or acrylic acid fluoroalkyl ester whose alkyl group or fluoroalkyl group has 1 to 3 carbon atoms; 4.9 to 50 mole %, preferably 19 to 40 mole %, of the methacrylate represented by Formula (II); and 0.1 to 10 mole %, preferably 1 to 5 mole %, of the above crosslinking monomer.

If the proportion of the acrylate represented by Formula (I) is less than 49.9 mole % or that of the methacrylate represented by Formula (II) is more than 50 mole % in the copolymer constituting the soft contact lens of this invention, it may follow that the hardness of the soft contact lens is increased and that the soft contact lens shows a large delayed elastic recovery. On the other hand, if the proportion of the acrylate represented by Formula (I) is more than 95 mole % or that of the methacrylate represented by Formula (II) is less than 4.9 mole %, there may be produced a problem that the oxygen permeability of the resulting soft contact lens is lowered. Also, if the proportion of the compound selected from the group consisting of acrylic acid, an acrylic acid alkyl ester or acrylic acid fluoroalkyl ester whose alkyl group or fluoroalkyl group has 1 to 3 carbon atoms is more than 10 mole %, the oxygen permeability of the soft contact lens may be lowered and the flexibility thereof tends to be lost. If the proportion of the crosslinking monomer is less than 0.1 mole %, the shape stability of the soft contact lens may be poor, and if it is more than 10 mole %, the soft contact lens may be brittle.

In the copolymer constituting the soft contact lens of this invention, the fluorine content is preferably 5 to 50% by weight, more preferably 10 to 45% by weight. If the fluorine content is less than 5% by weight, the oxygen permeability can not be sufficient, and if it is more than 50% by weight, there is a problem that the soft contact lens may show a large delayed elastic recovery.

The soft contact lens of this invention can be produced by, for example;

(1) a process which comprises polymerizing the monomer components directly in a mold; and (2) a process which comprises bringing a precursor lens in the shape of a contact lens comprising a rigid copolymer comprising, as monomer units, 49.9 to 95 mole % of at least one compound selected from the group consisting of acrylic acid, an acrylic acid alkyl ester or acrylic acid fluoroalkyl ester whose alkyl group or fluoroalkyl group has 1 to 3 carbon atoms and an acrylate represented by formula (I) shown above, 4.9 to 50 mole % of a methacrylate represented by Formula (II) shown above, and 0.1 to 10 mole % of a crosslinking monomer, into contact with an alcohol having at least 4 carbon atoms, whereby said acrylic acid in the rigid copolymer being esterified by said alcohol, and/or said acrylic acid alkyl ester or acrylic acid fluoroalkyl ester being transesterified by said alcohol.

Accordingly, treatment of bringing the precursor lens into contact with said alcohol in the process (2) is hereinafter referred to as treatment(s) of esterification and/or transesterification.

In the case of the process (1), however, there are problems such that a number of precision molds are required corresponding to the shape of contact lenses. Accordingly, it is preferable to employ the process (2).

The acrylic acid alkyl ester whose alkyl groups have 1 to 3 carbon atoms (hereinafter called "acrylic acid lower alkyl ester") and the acrylic acid fluoroalkyl ester whose fluoroalkyl groups have 1 to 3 carbon atoms (hereinafter called "acrylic acid lower fluoroalkyl ester"), which can be used in the above process (2), may include, for example, methyl acrylate, ethyl acrylate, n-propyl acrylate, and the like; and 2,2,2-trifluoroethyl acrylate, 2,2,3,3-tetrafluoropropyl acrylate, 2,2,3,3,3-pentafluoropropyl acrylate, and the like.

The proportion of the monomers used in the process (2) mentioned above may be determined substantially in accordance with the monomer composition in the desired copolymer to be obtained after treatment(s) of esterification and/or transesterification. Accordingly, the monomers may be used in the proportion of about 49.9 to 95 mole %, preferably 60 to 80 mole %, of the compound selected from the group consisting of acrylic acid, the acrylic acid lower alkyl ester, the acrylic acid lower fluoroalkyl ester and the acrylate represented by formula (I); about 4.9 to 50 mole %, preferably 19 to 40 mole %, of the methacrylic acid fluoroalkyl ester represented by Formula (II); and about 0.1 to 10 mole %, preferably 1 to 5 mole %, of the crosslinking monomer. The rigid copolymer obtained by copolymerizing these monomers may be subjected to treatment(s) of esterification and/or transesterification, whereby the monomer units originating from the acrylic acid, the acrylic acid lower alkyl ester, the acrylic acid lower fluoroalkyl ester can be esterified and/or transesterified in a very high degree (about 90% or more) to give a copolymer constituting the desired soft contact lens. In this occasion, the acrylate represented by Formula (I) can be remained as it is without being transesterified or can be transesterified, by appropriately selecting the conditions for the treatment(s) of esterification and/or transesterification. The methacrylic acid fluoroalkyl ester units of Formula (II) in the rigid copolymer are not affected by the treatment(s) of esterification and/or transesterification.

In the process (2), by copolymerizing the above monomers in the above proportion, there can be obtained a rigid copolymer usually having a glass transition temperature of about 50° C. or more, which can be converted to a copolymer having a glass transition temperature of 20° C. or less, preferably 0° C. or less, by subjecting it to the treatment(s) of esterification and/or transesterification. This glass transition temperature can be controlled according to the proportion of the monomers used.

The copolymerization of the above monomers may be carried out by conventional radical polymerizations. Methods for such copolymerization may include a method in which the polymerization is carried out by stepwise rising the temperature in the presence of a peroxide or azo compound such as benzoyl peroxide and azobisisobutyronitrile used as a catalyst; a method in which the polymerization is carried out by ultraviolet irradiation in the presence of a photopolymerization initiator such as benzoin methyl ether, benzoin isopropyl ether, benzophenone and Michler's ketone. The catalyst or the photopolymerization initiator may be used usually in an amount of 0.01 to 1 part by weight based on 100 parts by weight of all the monomers.

Subsequently, in the process (2), the resulting bulk rigid polymer may be cut and polished to prepare a rigid precursor lens having the same shape as an intended soft contact lens, and the precursor lens is softened by subjecting it to treatment(s) of esterification and/or transesterification to obtain the intended soft contact lens of this invention.

The treatment(s) of esterification and/or the transesterification can be carried out by bringing the precursor lens into contact with the alcohol, preferably, by immersing the precursor lens in the alcohol. The alcohol usable here may include alcohols having 4 or more carbon atoms, for example, straight chain alcohols having 4 to 10 carbon atoms such as n-butanol, n-pentanol, n-hexanol, n-heptanol, n-octanol, n-nonanol and n-decanol. The catalyst may be used for the esterification and the transesterification. The catalyst may be any of usual esterification catalysts, i.e., conc. sulfuric acid, methane sulfonic acid, etc. The concentration of the catalyst in the alcohol is preferably 0.2 to 10% by weight. Usually, the reaction can be sufficiently carried out under the conditions of a temperature of 20° to 200° C. and a reaction time of about 1 hour to 100 hours.

In the copolymer constituting the soft contact lens of this invention, obtained by the above process (2), the acrylic acid, acrylic acid lower alkyl ester and the acrylic acid lower fluoroalkyl ester constituting the rigid polymer before treatment(s) of esterification and/or transesterification may remain in amount of 10 mole % or less, preferably 5 mole %, or less, of the total amount. These do not adversely affect the performances such as oxygen permeability, of the soft contact lens of this invention.

According to the above process (2), the precursor lens comprising the above rigid copolymer can be obtained to have a small internal stress, and also the resulting soft contact lens of this invention, obtained by subjecting such a precursor to treatment(s) of esterification and/or transesterification, can be obtained to have a small internal stress. For this reason, it is presumed that no deformation occurs after release from a mold, or after softening by treatment(s) of esterification and/or transesterification. It is also presumed that, since the copolymer turns to have alkyl groups or fluoroalkyl groups in appropriate length as side chains as a result of the treatment(s) of esterification and/or transesterification, the soft contact lens of this invention can be soft, can have good wear fitness and can have very high oxygen permeability.

This invention will be further described by the following Examples and Comparative Examples, but by no means limited to these Examples.

EXAMPLE 1

To a mixture containing 70 mole % of acrylic acid, 27 mole % of 3,3,4,4,5,5,6,6,7,7,8,8,9,9,10,10,10-heptadecafluorodecyl methacrylate, and, 3 mole % of ethylene glycol dimethacrylate as a crosslinking monomer, 0.02 part by weight of benzoin methyl ether as a photopolymerization initiator based on 100 parts by weight of the above monomers was added. Thereafter, 1.5 cc of the mixture was poured into a mold made of polyethylene of 15 mm in diameter and 20 mm in height, followed by ultraviolet irradiation in an atmosphere of nitrogen at room temperature for 8 hours to carry out polymerization.

After polymerization, the resulting rigid copolymer was cut and polished into a precursor lens having the shape of an intended contact lens, and this precursor lens was immersed in n-hexyl alcohol, to which 1% by weight of conc. sulfuric acid was added to carry out reaction at the reflux temperature for 24 hours to esterify the acrylic acid in the copolymer. After the reaction, the esterification-treated copolymer was washed with n-hexyl alcohol, followed by drying to obtain a soft contact lens.

Degree of esterification of the acrylic acid in the copolymer by use of n-hexyl alcohol according to the above treatment of esterification was determined from the weight change measured before and after esterification of the precursor lens to find to be 95% or more.

Oxygen permeability coefficient of the resulting soft contact lens was measured using an oxygen permeability measuring apparatus produced by Rika Seiki Kogyo Co., Ltd., at 35° C. in a 0.9% physiological saline.

Visible light transmission of the soft contact lens was also measured using a double beam spectrometer of Type 200-20 produced by Hitachi Co., Ltd. After wearing of the resulting soft contact lens for a week, the visible light transmission was similarly measured.

Presence of deformation of the soft contact lens was also examined using a radius scope of Type CG-D produced by NEITZ Co. Results are shown in Table 1.

EXAMPLE 2

Polymerization and treatment of esterification with n-hexyl alcohol were carried out in the same manner as in Example 1 except that there were used ethyl acrylate in place of acrylic acid, and 3,3,4,4,5,5,6,6,7,7,8,8,8-tridecafluorooctyl methacrylate in place of 3,3,4,4,5,5,6,6,7,7,8,8,9,9,10,10,10-heptadecafluorodecyl methacrylate, to obtain a soft contact lens.

Here, the degree of transesterification of ethyl acrylate in the copolymer was determined in the same manner as in Example 1 to find to be 95% or more. In the same manner as in Example 1, the oxygen permeability coefficient, the visible light transmission and the presence of deformation of soft contact lens were measured on this soft contact lens. Results are shown in Table 1.

COMPARATIVE EXAMPLE 1

Polymerization and treatment of esterification with n-hexyl alcohol were carried out in the same manner as in Example 1 except that 2,2,2-trifluoroethyl methacrylate was used in place of 3,3,4,4,5,5,6,6,7,7,8,8,9,9,10,10,10-heptadecafluorodecyl methacrylate, to obtain a soft contact lens.

Here, the degree of esterification of acrylic acid in the copolymer was determined in the same manner as in Example 1 to find to be 95% or more. In the same manner as in Example 1, the oxygen permeability coefficient, the visible light transmission and the presence of deformation of soft contact lens were measured on this soft contact lens. Results are shown in Table 1.

COMPARATIVE EXAMPLE 2

Polymerization and treatment of esterification with n-hexyl alcohol were carried out in the same manner as in Example 1 except that 3,3,4,4,5,5,6,6,7,7,8,8,9,9,10,10,11,11,12,12,12-heneicosafluorododecyl methacrylate was used in place of 3,3,4,4,5,5,6,6,7,7,8,8,9,9,10,10,10-heptadecafluorodecyl methacrylate, to obtain a soft contact lens.

Here, the degree of esterification of acrylic acid in the copolymer was determined in the same manner as in Example 1 to find to be 95% or more. In the same manner as in Example 1, the oxygen permeability coefficient, the visible light transmission and the presence of deformation of soft contact lens were measured on this soft contact lens. Results are shown in Table 1.

COMPARATIVE EXAMPLE 3

Polymerization and treatment of esterification with n-hexyl alcohol were carried out in the same manner as in Example 1 except that n-decyl methacrylate was used in place of 3,3,4,4,5,5,6,6,7,7,8,8,9,9,10,10,10-heptadecafluorodecyl methacrylate, to obtain a soft contact lens.

Here, the degree of esterification of acrylic acid in the copolymer was determined in the same manner as in Example 1 to find to be 95% or more. In the same manner as in Example 1, the oxygen permeability coefficient, the visible light transmission and the presence of deformation of soft contact lens were measured on this resulting soft contact lens. Results are shown in Table 1.

COMPARATIVE EXAMPLE 4

Polymerization and treatment of esterification with n-hexyl alcohol were carried out in the same manner as in Example 1 except for using a mixture of 60 mole % of acrylic acid, 15 mole % of methyl methacrylate, 22 mole % of 3,3,4,4,5,5,6,6,7,7,8,8,8-tridecafluorooctyl methacrylate and 3 mole % of ethylene glycol dimethacrylate, to obtain a soft contact lens.

Here, the degree of esterification of acrylic acid in the copolymer was determined in the same manner as in Example 1 to find to be 95% or more. In the same manner as in Example 1, the oxygen permeability coefficient, the visible light transmission and the presence of deformation of soft contact lens were measured on this soft contact lens. Results are shown in Table 1.

COMPARATIVE EXAMPLE 5

Polymerization was carried out in the same manner as in Example 1 except for using a mixture of 20 mole % of methyl methacrylate and 80 mole % of 2,2,2-trifluoroethyl methacrylate, to obtain a rigid copolymer. This copolymer was cut into the shape of a contact lens and polish-finished. In the same manner as in Example 1, the oxygen permeability coefficient and the visible light transmission were measured on this soft contact lens. Results are shown in Table 1.

EXAMPLE 3

A rigid copolymer was obtained in the same manner as in Example 1, and then cut into the shape of a contact lens and polished to prepare a precursor lens in the shape of a contact lens. This precursor lens was esterified in the same manner as in Example 1 except for using n-decyl alcohol in place of n-hexyl alcohol, to obtain a soft contact lens. Here, the degree of esterification of acrylic acid in the copolymer was determined in the same manner as in Example 1 to find to be 95% or more.

In the same manner as in Example 1, the oxygen permeability coefficient, the visible light transmission and the presence of deformation of soft contact lens were measured on this soft contact lens. Results are shown in Table 1.

EXAMPLE 4

Polymerization was carried out in the same manner as in Example 1 except for using a mixture of 40 mole % of acrylic acid, 17 mole % of 2,2,3,3,4,4,5,5-octafluoropentyl acrylate, 40 mole % of 3,3,4,4,5,5,6,6,7,7,8,8,8-tridecafluorooctyl methacrylate and 3 mole % of ethylene glycol dimethacrylate, and the resulting copolymer was then treated with n-hexyl alcohol in the same manner as in Example 1 to obtain a soft contact lens. Here, the degree of esterification of acrylic acid and degree of transesterification of 2,2,3,3,4,4,5,5-octafluoropentyl acrylate in the copolymer were determined in the same manner as in Example 1 to find to be both 95% or more.

In the same manner as in Example 1, the oxygen permeability coefficient, the visible light transmission and the presence of deformation of soft contact lens were measured on this soft contact lens. Results are shown in Table 1.

EXAMPLE 5

Polymerization was carried out in the same manner as in Example 1 except for using a mixture of 65 mole % of acrylic acid, 12 mole % of 2,2,3,3,4,4,5,5,6,6,7,7-dodecafluoroheptyl acrylate, 20 mole % of 3,3,4,4,5,5,6,6,7,7,8,8,9,9,10,10,10-heptadecafluorodecyl methacrylate and 3 mole % of 1,4-butanediol dimethacrylate, and the resulting copolymer was then treated with n-hexyl alcohol in the same manner as in Example 1 to obtain a soft contact lens.

Here, the degree of esterification of acrylic acid and degree of transesterification of 2,2,3,3,4,4,5,5,6,6,7,7-dodecafluoroheptyl acrylate in the copolymer were determined in the same manner as in Example 1 to find to be 95% or more and 90% or more, respectively.

In the same manner as in Example 1, the oxygen permeability coefficient, the visible light transmission and the presence of deformation of soft contact lens were measured on this soft contact lens. Results are shown in Table 1.

TABLE 1

| | Oxygen permeability coefficient (cc(STP)·cm/cm²·sec·mmHg) | Visible light transmission Before wearing | Visible light transmission after 1 week wearing | Presence of deformation |
|---|---|---|---|---|
| Example | | | | |
| 1 | 9.24 × 10⁻¹⁰ | 98 | 98 | None |
| 2 | 8.44 × 10⁻¹⁰ | " | " | " |
| 3 | 9.04 × 10⁻¹⁰ | " | " | " |
| 4 | 8.12 × 10⁻¹⁰ | " | " | " |
| 5 | 7.45 × 10⁻¹⁰ | " | " | " |
| Comparative Example | | | | |
| 1 | 2.04 × 10⁻¹⁰ | 98 | 96 | None |
| 2 | 7.36 × 10⁻¹⁰ | " | 98 | Present |
| 3 | 1.02 × 10⁻¹⁰ | " | 88 | None |
| 4 | 1.22 × 10⁻¹⁰ | " | 98 | " |
| 5 | 0.96 × 10⁻¹⁰ | " | 98 | — |

TEST EXAMPLE 1

The soft contact lens obtained in Examples 1 to 5 were worn on right eye of each of five rabbits. As a result, there was found no ceratonosus on the surface of cornea, and also found no neogenetic blood vessel or corneal edema from a histological view.

What is claimed is:

1. A non-hydrous soft contact lens comprising a copolymer comprising, as monomer units:

(a) 49.9 to 95 mol % of an acrylate having the formula (I):

wherein $R^1$ is at least one group selected from the group consisting of a straight chain fluoroalkyl group having the formula: $-(CH_2)_l-C_mF_nH_p$, where l is an integer of 1 or 2, m is an integer of 3 to 8, n is an integer of 6 or more, p is an integer of 0 or more, and m, n and p satisfy the equation: $n+p=2m+1$; and a straight chain alkyl group having the formula: $-C_qH_{2q+1}$, where q is an integer of 4 to 10;

(b) 0 to 10 mole % of at least one compound selected from the group consisting of acrylic acid, an acrylic acid alkyl ester and an acrylic acid fluoroalkyl ester having an alkyl group or fluoroalkyl group of 1 to 3 carbon atoms;

(c) 4.9 to 50 mole % of a methacrylate having the formula (II):

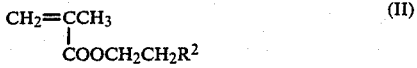

wherein $R^2$ is a straight chain fluoroalkyl group having the formula: $-C_xF_yH_z$, where x is an integer of 6 to 8, y is an integer of 12 or more, z is an integer of 0 or more, and x, y and z satisfy the equation: $y+z=2x+1$; and (d) 0.1 to 10 mole % of a crosslinking monomer.

2. The soft contact lens according to claim 1, wherein said copolymer comprises, as monomer units, 60 to 80 mole % of the acrylate represented by formula (I), 0 to 5 mole % of the compound selected from the group consisting of acrylic acid, an acrylic acid alkyl ester or acrylic acid fluoroalkyl ester having an alkyl or fluoroalkyl group of 1 to 3 carbon atoms, 19 to 40 mole % of said methacrylate represented by formula (II), and 1 to 5 mole % of said crosslinking monomer.

3. The soft contact lens according to claim 1, wherein said acrylate represented by Formula (I) is at least one selected from the group consisting of 2,2,3,3,4,4,4-heptafluorobutyl acrylate, 2,2,3,4,4,4-hexafluorobutyl acrylate, 3,3,4,4,5,5,6,6,7,7,8,8-tridecafluorooctyl acrylate, 3,3,4,4,5,5,6,6,7,7,8,8,9,9,10,10,10-heptadecafluorodecyl acrylate, n-hexyl acrylate, and n-octyl acrylate.

4. The soft contact lens according to claim 1, wherein said methacrylate represented by Formula (II) is at least one selected from the group consisting of 3,3,4,4,5,5,6,6,7,7,8,8-tridecafluorooctyl methacrylate and 3,3,4,4,5,5,6,6,7,7,8,8,9,9,10,10,10-hepadecafluorodecyl methacrylate.

5. The soft contact lens according to claim 1, wherein said crosslinking monomer is at least one selected from the group consisting of dimethacrylate esters of ethylene glycol, diethylene glycol, 1,3-butanediol, 1,4-butanediol and 1,6-hexanediol.

6. The soft contact lens according to claim 1, wherein said copolymer contains 5 to 50% by weight of fluorine.

7. The soft contact lens according to claim 1, wherein said copolymer has a glass transition temperature of 20° C. or less.

8. The soft contact lens according to claim 1, wherein said acrylate having the formula (I) is at least one acrylate selected from the group consisting of an acrylic acid fluoroalkyl ester selected from the group consisting of 2,2,3,4,4,4-hexafluorobutyl acrylate, 2,2,3,3,4,4,4-heptafluorobutyl acrylate, 2,2,3,3,4,4,5,5-octafluoropentyl acrylate, 2,2,3,3,4,4,5,5,5-nonafluoropentyl acrylate, 2,2,3,3,4,4,5,5,6,6,7,7,-dodecafluoroheptyl acrylate, 2,2,3,3,4,4,5,5,6,6,7,7,7-tridecafluoroheptyl acrylate, 3,3,4,4,5,5,6,6,7,7,8,8-dodecafluorooctyl acrylate, 3,3,4,4,5,5,6,6,7,7,8,8,8-tridecafluorooctyl acrylate, 3,3,4,4,5,5,6,6,7,7,8,8,9,9,10,10-hexadecafluorodecyl acrylate and 3,3,4,4,5,5,6,6,7,7,8,8,9,9,10,10,10-heptadecafluorodecyl acrylate; and an acrylic acid alkyl ester selected from the group consisting of n-butyl acrylate, n-pentyl acrylate, n-hexyl acrylate, n-heptyl acrylate, 2-ethylhexyl acrylate, n-octyl acrylate, n-nonyl acrylate, n-decyl acrylate.

9. The soft contact lens according to claim 1, wherein said methacrylate having the formula (II) is at least one selected from the group consisting of 3,3,4,4,5,5,6,6,7,7,8,8-dodecafluorooctyl methacrylate, 3,3,4,4,5,5,6,6,7,7,8,8-tridecafluoroocyl methacrylate, 3,3,4,4,5,5,6,7,7,8,8,9,9,10,10,-hexadecafluorodecyl methacrylate and 3,3,4,4,5,5,6,6,7,7,8,8,9,9,10,10,10-heptadecafluorodecyl methacrylate.

10. The soft contact lens according to claim 1, wherein said copolymer contains 10 to 45% by weight of fluorine.

* * * * *